United States Patent
Scherer et al.

(10) Patent No.: US 10,651,699 B2
(45) Date of Patent: May 12, 2020

(54) STATOR OF AN ELECTRIC MACHINE AND PRODUCTION THEREOF

(71) Applicant: SIEMENS AKTIENGESELLSCHAFT, München (DE)

(72) Inventors: Matthias Scherer, Nürnberg (DE); Christian Deeg, Altdorf (DE); Benjamin Eichinger, Winkelhaid (DE); Eric Joseph, Nürnberg (DE); Uwe Scharf, Schwabach (DE); Michael Stegherr, Nürnberg (DE); Sebastian Weiss, Oberasbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 645 days.

(21) Appl. No.: 15/304,351

(22) PCT Filed: Mar. 25, 2015

(86) PCT No.: PCT/EP2015/056327
§ 371 (c)(1),
(2) Date: Oct. 14, 2016

(87) PCT Pub. No.: WO2015/158508
PCT Pub. Date: Oct. 22, 2015

(65) Prior Publication Data
US 2017/0047803 A1   Feb. 16, 2017

(30) Foreign Application Priority Data
Apr. 15, 2014   (EP) .................... 14164702

(51) Int. Cl.
*H02K 15/09* (2006.01)
*H02K 3/12* (2006.01)
(Continued)

(52) U.S. Cl.
CPC ............... *H02K 3/12* (2013.01); *H02K 1/146* (2013.01); *H02K 1/16* (2013.01); *H02K 3/14* (2013.01);
(Continued)

(58) Field of Classification Search
CPC .. H02K 3/30; H02K 3/12; H02K 3/34; H02K 3/345; H02K 3/38; H02K 3/493;
(Continued)

(56) References Cited

U.S. PATENT DOCUMENTS 1,605,112 A  * 11/1926  Huggins ................ H02K 3/493
                                              310/214
1,826,296 A  * 10/1931  Apple .................... H02K 15/12
                                              310/201
(Continued)

FOREIGN PATENT DOCUMENTS

CN          103 701 266 A     4/2014
CN          103701266 A       4/2014
(Continued)

*Primary Examiner* — Edgardo San Martin
(74) *Attorney, Agent, or Firm* — Henry M. Feiereisen LLC

(57) ABSTRACT

A stator for a rotating electric machine includes a laminate stack having a plurality of slots open towards an air gap between the stator and a rotor of the electric machine. A winding includes coils which have turns that pass through the slots of the laminate stack. The turns of the coils are electrically insulated the within the slots from each other and from the laminate stack by a ceramic material.

14 Claims, 14 Drawing Sheets

(51) Int. Cl.
*H02K 3/34* (2006.01)
*H02K 3/50* (2006.01)
*H02K 3/30* (2006.01)
*H02K 3/493* (2006.01)
*H02K 15/00* (2006.01)
*H02K 15/04* (2006.01)
*H02K 15/10* (2006.01)
*H02K 3/14* (2006.01)
*H02K 3/38* (2006.01)
*H02K 1/14* (2006.01)
*H02K 1/16* (2006.01)
*H02K 3/18* (2006.01)
*H02K 15/02* (2006.01)
*H02K 15/06* (2006.01)

(52) U.S. Cl.
CPC ............ *H02K 3/18* (2013.01); *H02K 3/30* (2013.01); *H02K 3/34* (2013.01); *H02K 3/345* (2013.01); *H02K 3/38* (2013.01); *H02K 3/493* (2013.01); *H02K 15/0018* (2013.01); *H02K 15/0081* (2013.01); *H02K 15/022* (2013.01); *H02K 15/0414* (2013.01); *H02K 15/062* (2013.01); *H02K 15/105* (2013.01)

(58) Field of Classification Search
CPC ...... H02K 3/50; H02K 3/487; H02K 15/0018; H02K 15/0081; H02K 15/0031; H02K 15/026; H02K 15/09; H02K 15/105; H02K 15/0414; H02K 15/062; H02K 29/08; Y10T 29/49073; Y10T 29/49078
See application file for complete search history.

(56) References Cited

U.S. PATENT DOCUMENTS

| | | | | |
|---|---|---|---|---|
| 3,742,122 A * | 6/1973 | Blavos | ............ | H01R 4/625 174/94 R |
| 4,308,476 A * | 12/1981 | Schuler | ............ | H02K 3/40 174/34 |
| 4,486,506 A * | 12/1984 | Kenjo | ............ | B32B 27/08 428/475.2 |
| 4,602,180 A * | 7/1986 | Olson | ............ | H02K 3/38 310/201 |
| 4,724,600 A * | 2/1988 | Studniarz | ............ | H02K 3/32 29/596 |
| 4,853,565 A * | 8/1989 | Elton | ............ | H02K 3/40 310/45 |
| 5,175,396 A * | 12/1992 | Emery | ............ | H02K 3/40 174/120 SC |
| 5,359,249 A * | 10/1994 | Tanaka | ............ | H02K 1/165 29/596 |
| 5,598,049 A * | 1/1997 | Meier | ............ | H02K 3/48 310/214 |
| 6,353,198 B1 | 3/2002 | Tong et al. | | |
| 7,812,498 B2 | 10/2010 | Kouda | | |
| 8,531,074 B2 * | 9/2013 | Wolf | ............ | H02K 3/12 310/179 |
| 9,793,773 B2 * | 10/2017 | Iki | ............ | H02K 3/28 |
| 9,973,063 B2 * | 5/2018 | Friot | ............ | H02K 15/0018 |
| 2002/0047456 A1 * | 4/2002 | Murayama | ............ | H02K 3/487 310/214 |
| 2003/0233747 A1 | 12/2003 | Gorohata et al. | | |
| 2005/0200212 A1 * | 9/2005 | Lima | ............ | H02K 1/20 310/59 |
| 2009/0261682 A1 * | 10/2009 | Fubuki | ............ | H02K 3/12 310/201 |
| 2012/0194028 A1 | 8/2012 | Campbell | | |
| 2015/0280503 A1 * | 10/2015 | Takahashi | ............ | H02K 3/12 310/201 |

FOREIGN PATENT DOCUMENTS

| | | |
|---|---|---|
| DE | 10 2008 055 594 A1 | 7/2009 |
| DE | 10 2009 037 581 A1 | 2/2011 |
| EP | 2 573 908 A2 | 3/2013 |
| EP | 2 621 062 A1 | 7/2013 |
| JP | S61177143 A | 8/1986 |
| RU | 2134010 C1 | 7/1999 |
| RU | 2422968 C2 | 6/2011 |
| UA | 71283 A | 11/2004 |
| WO | WO 2007124985 A1 | 11/2007 |

* cited by examiner

STATOR OF AN ELECTRIC MACHINE AND PRODUCTION THEREOF

CROSS-REFERENCES TO RELATED APPLICATIONS

This application is the U.S. National Stage of International Application No. PCT/EP2015/056327, filed Mar. 25, 2015, which designated the United States and has been published as International Publication No. WO 20151158508 which claims the priority of European Patent Application, Serial No. 14164702.4, filed Apr. 15, 2014, pursuant to 35 U.S.C. 119(a)-(d).

BACKGROUND OF THE INVENTION

The invention relates to a stator of a rotating electric machine and a method for the automated production of a winding of a stator of a rotating electric machine.

Rotating electric machines, in particular high-voltage asynchronous machines, consist as a general rule of a laminate stack having slots punched thereinto and a so-called distributed winding laid therein. Said winding is constructed from individual coils which exhibit a relatively complex three-dimensional geometry. The production of such a coil geometry is elaborate and time-consuming. In particular, tight radii in the region of the winding overhang must often be insulated by hand because winding machines would require considerably longer in comparison for such regions and a protracted set-up procedure would be needed. This is necessary on account of the requisite high level of variance in specific customer solutions. In consequence thereof, de facto often only one coil set of the same construction is produced in each case.

SUMMARY OF THE INVENTION

The object of the invention is to specify an improved stator of a rotating electric machine and an improved method for the production of a winding of a stator of a rotating electric machine.

According to one aspect of the invention, the object is achieved by a stator of a rotating electric machine, which stator includes a laminate stack having a plurality of slots open towards an air gap between the stator and a rotor of the electric machine, and a winding having a plurality of coils, the turns of which each pass through slots of the laminate stack. In this case, the turns of the coils within the slots are electrically insulated from one another and from the laminate stack by a ceramic material.

Advantageous embodiments of the invention are set down in the subclaims.

The electrical insulation of the turns of the coils within the slots by a ceramic material has the advantage that ceramic material is a particularly good electrical insulator, which means that the insulation layers between the turns can be designed particularly thinly. Furthermore, such thin insulation layers also improve the heat dissipation from the slots. In addition, the heat resistance of ceramic is significantly greater than the heat resistance of conventional tape insulation.

An embodiment of the stator provides that each slot is closed with a profile bar on the air gap side.

By this means the turns of the coils within the slots are advantageously held and fixed in the slot.

According to another aspect of the invention, a profile bar for closing a slot on the air gap side in a laminate stack of a stator includes a base body made of fiber glass with an overlay made of a magnetically conductive and electrically insulating material.

Such a profile bar is advantageously suitable not only for fixing the turns of coils in a slot but also for guiding the magnetic flux and thereby for homogenizing the magnetic field in the air gap between the stator and the rotor of the electric machine on the basis of the magnetic conductivity of the overlay of the base body and the fact that fiber glass behaves similarly to air in respect of its magnetic properties and can, given a suitable geometric design of the base body, thereby bring about a sufficiently great magnetic resistance in the opening region of the slot in order to minimize scatter fields.

An embodiment of the profile bar provides that the overlay is made of a so-called soft magnetic composite (SMC).

On account of its high magnetic permeability and at the same time its high electrical insulating effect, SMC is particularly advantageously suitable as a material for the overlay of the profile bar for homogenizing the magnetic field in the air gap between the stator and the rotor.

A further embodiment of the profile bar provides that the base body has the shape of a straight prism with a triangular base area, from which on two of the edges orthogonal to the base area a flange sticks out in each case, so that the base body has a T-shaped cross-section with arms formed by the flanges, and a triangular foot.

The design of the base body with a T-shaped cross-section which has a triangular foot has the advantage on the one hand that the bar of the T can be used for anchorage purposes in recesses in the side walls of a slot and thereby for the stable anchorage of the profile bar in the slot (cf. exemplary embodiments below). On the other hand, with regard to the orientation of the triangular foot with respect to the air gap between the stator and the rotor, this brings about a tapering of the base body on the air gap side which reduces magnetic scatter losses and thereby advantageously contributes to homogenizing the magnetic field in the air gap.

A further embodiment of the profile bar provides that the overlay has the form of two lateral bodies which each have a lozenge-shaped cross-section and rest on a flange surface of a flange and a prism lateral surface of the base body adjoining it.

This implementation of the overlay likewise advantageously reduces magnetic scatter losses and thereby advantageously contributes to homogenizing the magnetic field in the air gap.

According to still another aspect of the invention, involves a method for the automated production of a winding of a stator of a rotating electric machine, wherein the winding includes a plurality of coils and the stator has a laminate stack with slots, through which turns of the coils of the winding run. In this situation, a plurality of conductor bundles of conductors which are straight, parallel to one another and electrically insulated from one another, and which are each longer than a slot are produced. Each conductor bundle is introduced into a slot of the stator, so that both conductor ends of each conductor project out of the slot. The conductor ends of the conductors are electrically connected to coils of the winding at both axial laminate stack ends of the laminate stack by means of a winding overhang in each case.

The core idea of the method according to the invention is based on not producing the winding or the coils thereof in one piece but to manufacture them in individual steps in which in each case only segments of the winding and coils are produced which can be fabricated, positioned and subsequently connected to one another in automated fashion. In particular, the method advantageously utilizes the fact that conductor bundles of straight conductors can be produced, introduced into slots and connected to one another by means of winding overhangs in automated fashion.

An embodiment of the method provides that the conductors of a conductor bundle are electrically insulated from one another by a ceramic material in the whole region which is introduced into a slot.

The advantages of using ceramic material for insulating the conductors have already been stated above. Ceramic material can be used with the method for the automated insulation of the conductors within the slots because the straight conductors of the conductor bundles in the slots are connected with one another not in deformed fashion but only outside the slots by means of winding overhangs.

A further embodiment of the method provides that in order to produce a conductor bundle an insulating hollow body is produced for each conductor and is cast homogeneously and without air bubbles for the fabrication of the conductors using an electrically conductive material.

A similar, alternative embodiment of the method provides that in order to produce a conductor bundle an insulating hollow body block with through-holes for the conductors is produced and is cast homogeneously and without air bubbles using an electrically conductive material.

These embodiments therefore provide in each case for initially fabricating the electrical insulations of the conductors in the slots and thereafter casting the conductors therein. These embodiments can also advantageously be implemented in automated fashion.

A further embodiment of the method, an alternative to the two aforementioned embodiments, provides that in order to produce a conductor bundle conductor bars which are longer than a slot are produced and are introduced spaced apart from one another into a blank mold which has the same length as a slot, so that the conductor ends of the conductor bars project out of the blank mold on both sides, and for the electrical insulation of the conductor bars the blank mold is filled with an electrically insulating material and is removed after the insulation material has hardened.

This embodiment therefore provides for initially fabricating the conductors to be introduced into the slots and thereafter to cast the insulation around said conductors. This embodiment can also advantageously be implemented in automated fashion.

A further embodiment of the method provides that each slot is closed with a profile bar on the air gap side.

The use of profile bars for closing slots has the advantages already stated above, in particular if inventive profile bars described above are used. This embodiment can also advantageously be implemented in automated fashion.

A further embodiment of the method provides that in order to produce a winding overhang in each case two conductor ends are soldered to a connection conductor. In this situation, each connection conductor is preferably connected to two conductor ends by way of a plug-in connection prior to soldering.

These embodiments enable the automated connection of conductor ends by means of soldering to prefabricated connection conductors. Plug-in connections are advantageous in this situation because they can simplify the positioning of the connection conductors and compensate for manufacturing tolerances.

An embodiment of the method which is an alternative to the aforementioned embodiment provides that in order to produce a winding overhang in each case two conductor ends projecting out of different slots are bent towards one another and are then electrically connected to one another.

With regard to this embodiment, no prefabricated connection conductors are therefore required. Said embodiment can advantageously be implemented in automated fashion by means of a robotic system suited for the purpose, cf. the exemplary embodiments below (in particular the description of FIGS. 10 to 18).

A further embodiment of the method provides that the winding is cast using an insulation material in the region of the winding overhang.

Casting with insulation material advantageously enables a relatively simple automated insulation of the winding overhang.

BRIEF DESCRIPTION OF THE DRAWING

The properties, features and advantages of this invention described above and also the manner in which they are achieved will become more clearly and obviously understandable in conjunction with the following description of exemplary embodiments which are explained in detail with reference to a drawings. In the drawings.

DETAILED DESCRIPTION OF PREFERRED EMBODIMENTS

Figure 1:
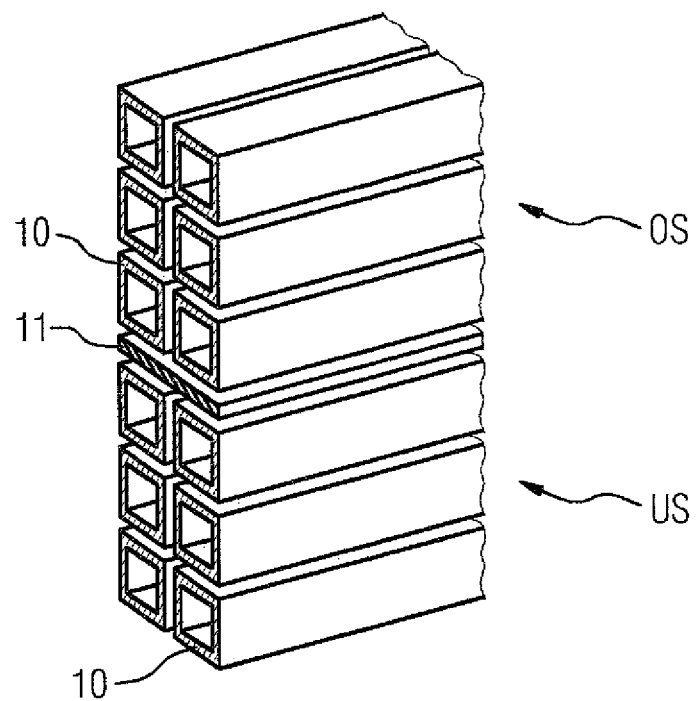
FIG. 1 shows a perspective view of insulating hollow bodies.

Parts corresponding to one another are identified by the same reference characters in all the figures.

FIGS. 1 to 6 show a first exemplary embodiment of a stator 100 of a rotating electric machine and a method for the automated production of a winding 102 of the stator 100. The stator 100 comprises a laminate stack 104 having a plurality of slots 106 open towards an air gap between the stator 100 and a rotor of the electric machine. The winding 102 includes coils, the turns of which each pass through slots 106 of the laminate stack 104.

In order to produce the winding 102, in a variant of said exemplary embodiment a plurality of straight tube-like insulating hollow bodies 10 illustrated in FIG. 1 are produced initially from an electrically insulating insulation material, preferably from a ceramic material. Each of said insulating hollow bodies 10 is at least as long as a slot 106 and has a cross-section with a rectangular outer contour. The insulating hollow bodies 10 are stacked in automated fashion to form insulating hollow body stacks, each of which can be introduced into a slot 106.

Figure 9:
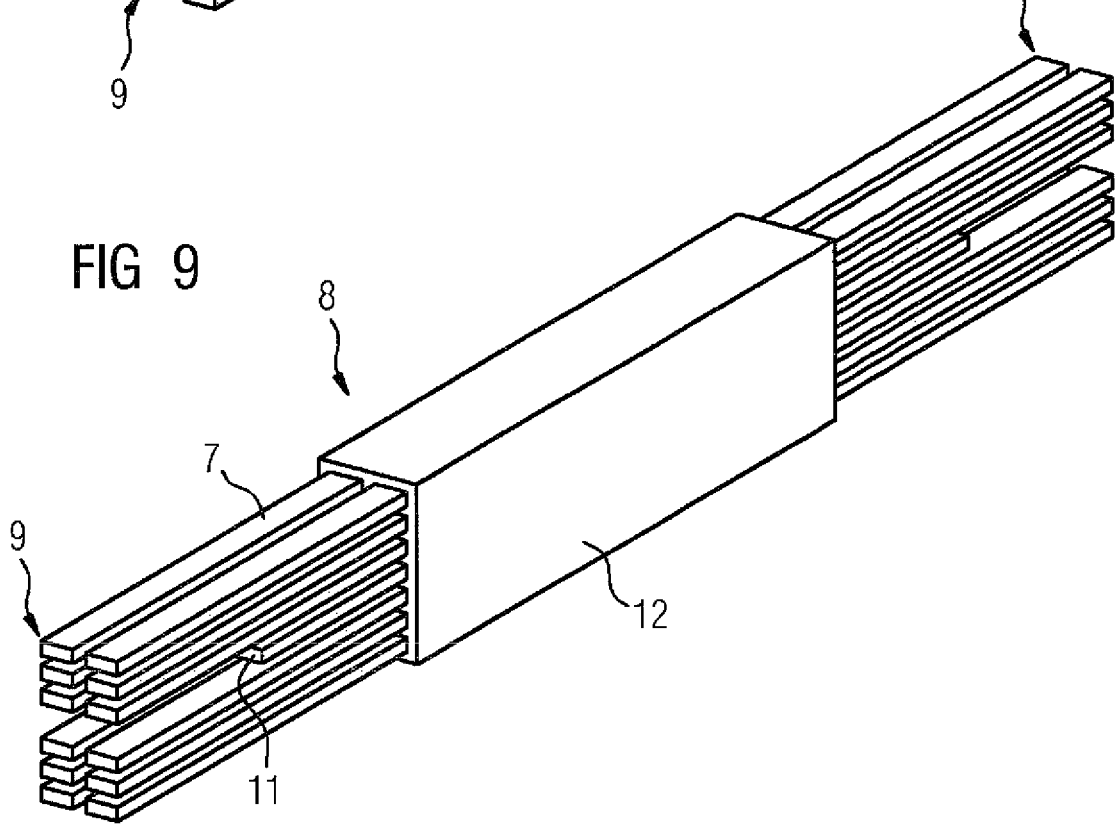
FIG. 9 shows a perspective view of a conductor bundle.

The insulating hollow body stacks are subsequently cast homogeneously and without air bubbles in automated fashion using an electrically conductive material, preferably using aluminum for example in an aluminum pressure die casting process or using copper for example in a vacuum continuous copper casting process. In this situation, additional casting molds are used which extend the insulating hollow body stacks at their ends and are removed after the casting, so that a conductor bundle 8 of insulated straight conductors 1 to 6, A to F, which in each case run through an insulating hollow body 10 and the conductor ends 9 of which are protruding from the insulating hollow body stack by analogy with FIG. 9, is produced from each insulating hollow body stack. A separating layer 11 is arranged as required between two layers of insulating hollow bodies 10 of a conductor bundle 8 in order to separate conductors 1 to 6, A to F of a so-called lower layer US and a so-called upper layer OS of a slot 106 from one another, cf. FIGS. 2 to 4. In addition to or as an alternative to the separating layer 11, a cooling channel can also be arranged between two layers of insulating hollow bodies 10 of a conductor bundle 8.

In an alternative variant of the exemplary embodiment, instead of individual insulating hollow bodies 10 insulating hollow body blocks 12 (cf. FIG. 9) are produced which in each case correspond to an insulating hollow body stack, have a plurality of through-holes running in a longitudinal direction, and are cast homogeneously and without air bubbles in automated fashion using an electrically conductive material, likewise preferably using aluminum for example in an aluminum pressure die casting process or using copper for example in a vacuum continuous copper casting process. In this situation also, additional casting molds are used which extend the insulating hollow body blocks 12 at their ends and are removed after the casting, so that a conductor bundle 8 of straight conductors 1 to 6, A to F, which in each case run through a through-hole in the insulating hollow body block 12 and the conductor ends 9 of which are protruding from the insulating hollow body block 12, is produced from each insulating hollow body block 12.

The conductor bundles 8 are introduced into the slots 106 in automated fashion.

Figure 2:
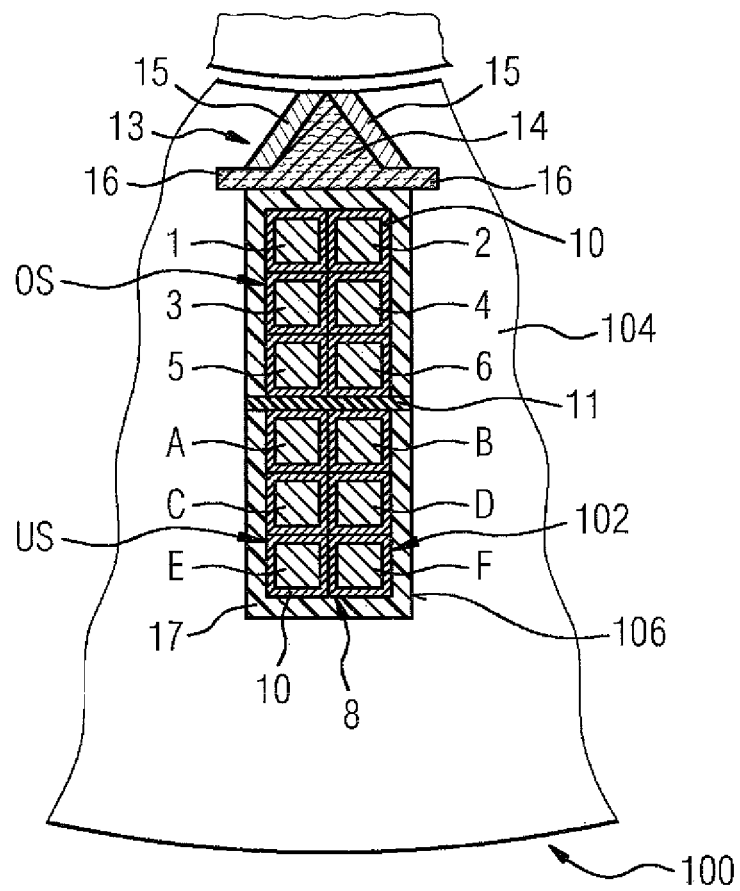
FIG. 2 shows a cross-section of a stator in the region of a slot.
Figure 3:
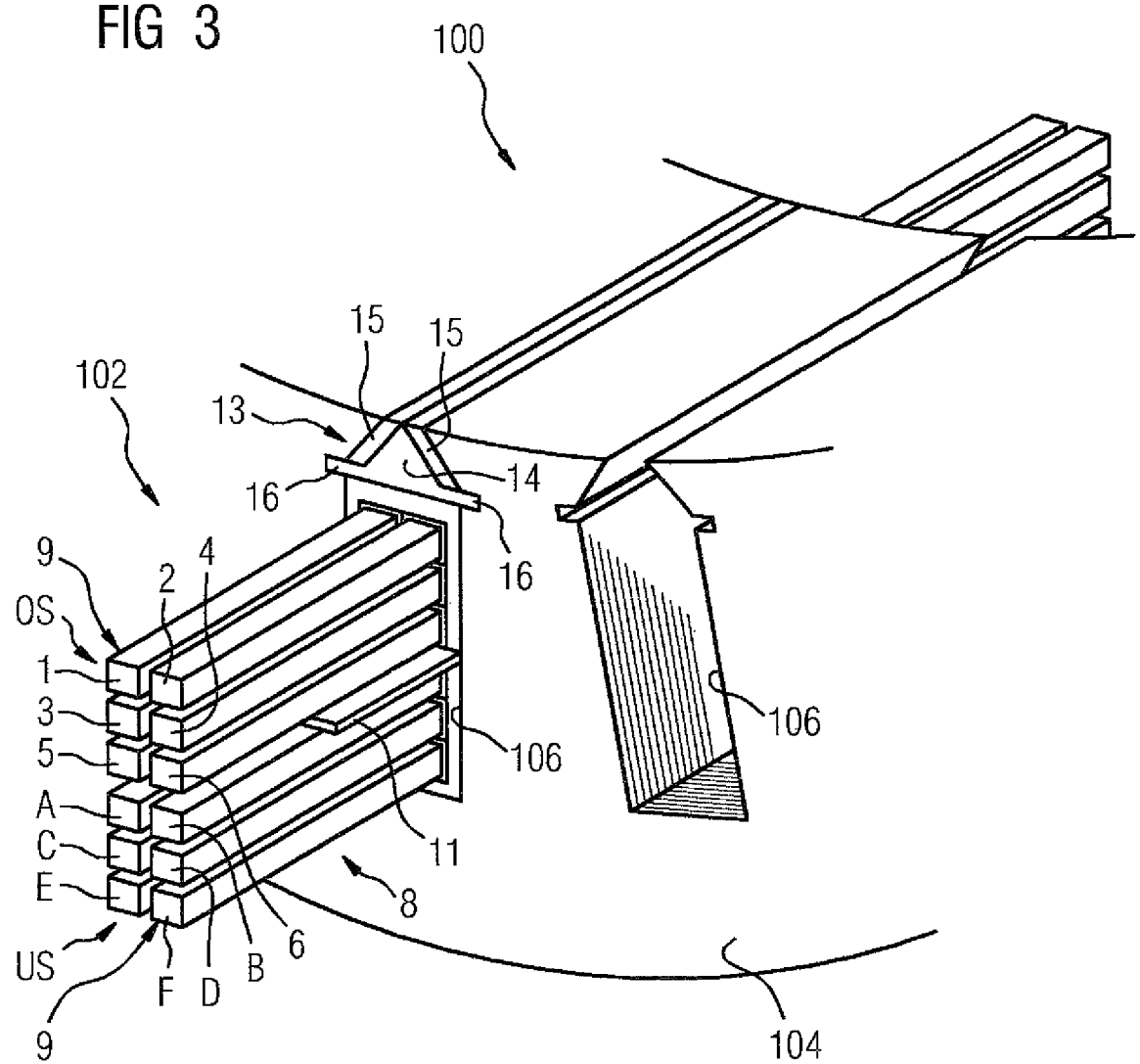
FIG. 3 shows a perspective view of a stator in the region of a slot.
Figure 4:
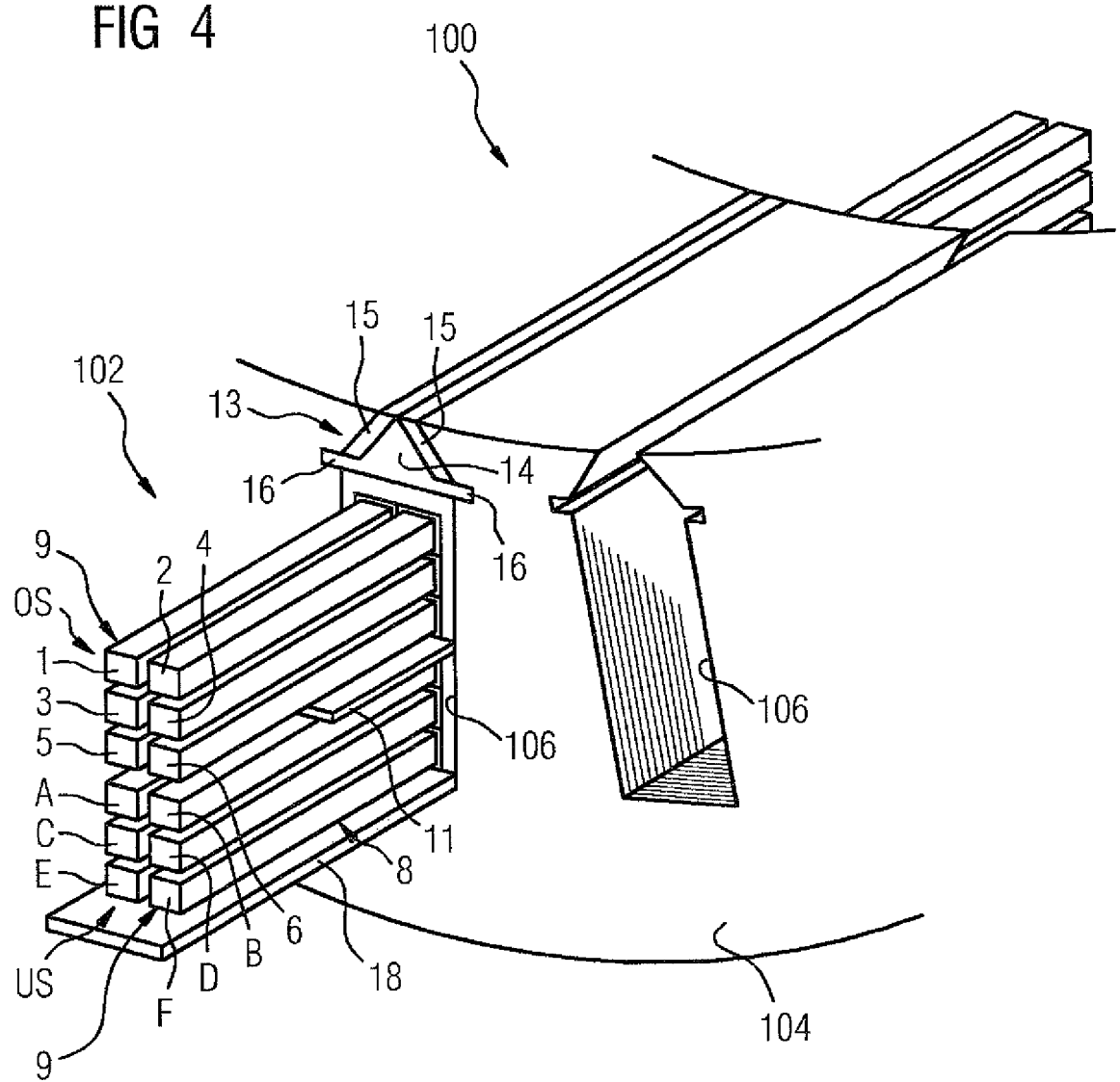
FIG. 4 shows a perspective view of a stator in the region of a slot and an electrical steel bar.

FIGS. 2 to 4 show the stator 100 in the region of a slot 106 into which a conductor bundle 8 is introduced. In this situation, FIG. 2 shows a cross-section of the stator 100 in the region of the slot 106 and FIGS. 3 and 4 in each case show a perspective view of the stator 100 in the region of the slot 106 with a further slot 106 into which no conductor bundle 8 has yet been introduced. The conductor bundle 8 has a separating layer 11 which separates conductors A to F of a lower layer US on the slot base side from conductors 1 to 6 of an upper layer OS of conductors 1 to 6, A to F on the air gap side in the slot 106.

FIGS. 2 to 4 also show a profile bar 13 with which a slot 106 is closed on the air gap side. The profile bar 13 includes a base body 14 made of fiber glass with an overlay made of a magnetically conductive and electrically insulating material which is preferably a so-called soft magnetic composite (SMC). In the exemplary embodiment illustrated the overlay has the form of two lateral bodies 15 resting on the base body 14. The base body 14 has the shape of a straight prism with a triangular base area orthogonal to a longitudinal axis of the slot 106, from which on two edges running along the slot 106 a flange 16 sticks out in each case, so that the base body 14 has a T-shaped cross-section with arms formed by the flanges 16, and a triangular foot. The flangeless third edge of the base body 14 running along the slot 106 faces the air gap. The lateral bodies 15 each have a lozenge-shaped cross-section and in each case rest on a flange surface facing the air gap of a flange 16 and the prism lateral surface of the base body 14 adjoining it.

In an opening region on the air gap side the slot 106 has a cross-section corresponding to the cross-section of the profile bar 13, so that the profile bar 13 can be inserted into the opening region with a precise fit. Between the opening region and the slot base the slot 106 has a rectangular cross-section. The opening region of the slot 106 is wider in the region of the flanges 16 of the profile bar 13 than the region having the rectangular cross-section and narrows towards the air gap, or the distance between the ends of the two flanges 16 is greater than the width of the region of the slot 106 having the rectangular cross-section and the width of the profile bar 13 reduces towards the air gap, so that the profile bar 13 cannot be pushed out of the slot 106 and holds and fixes the conductor bundles 8 in the slot 106.

In addition to fixing the conductor bundles 8 in the slot 106, the profile bar 13 advantageously serves to conduct the magnetic flux and thereby effects homogenization of the magnetic field in the air gap through the material of the lateral bodies 15 and the shape of the base body 14 and of the lateral bodies 15. SMC is particularly well suited for example as a material for the lateral bodies 15 on account of its high magnetic permeability. The shape of the base body 14 and of the lateral bodies 15 is chosen in such a manner that magnetic scatter losses remain low. This is achieved by way of the narrowing towards the air gap of the base body 14 which behaves similarly to air in its magnetic properties and thereby produces a sufficiently high magnetic resistance in the opening region of the slot 106 in order to minimize scatter fields.

If the conductor bundles 8 are not a precise fit for the slots 106, for example because they are so brittle that they must be kept away from the edges of the laminate stack 104, for example an expanding filler material 17 which has good thermal conductivity and does not allow any eddy currents is introduced into the slots 106. Said filler material surrounds the conductor bundles 8 in the slots 106 and is either applied onto the conductor bundles 8 or injected after the introduction of the conductor bundles 8 into the slots 106. The filler material is for example chosen such that it expands of its own accord after being introduced into the slots 106 or as a result of injecting a gas or as a result of heating. Alternatively or additionally, a non-expanding solid material having good thermal conductivity and being electrically insulating or magnetically low-loss, is introduced into the slots 106 at the slot base in each case, for example as illustrated in FIG. 4 a cured or bonded segmented electrical steel bar 18 or alternatively a rod which is manufactured from SMC.

A conductor bundle 8 is inserted in automated fashion into a slot 106 either before, after or together with the profile bar 13, or it is inserted into the slot 106 from the air gap prior to the automated insertion of the profile bar 13, where in the latter case the opening region of the slot 106 is designed to be sufficiently wide on the air gap side in order to insert a conductor bundle 8.

Figure 5:
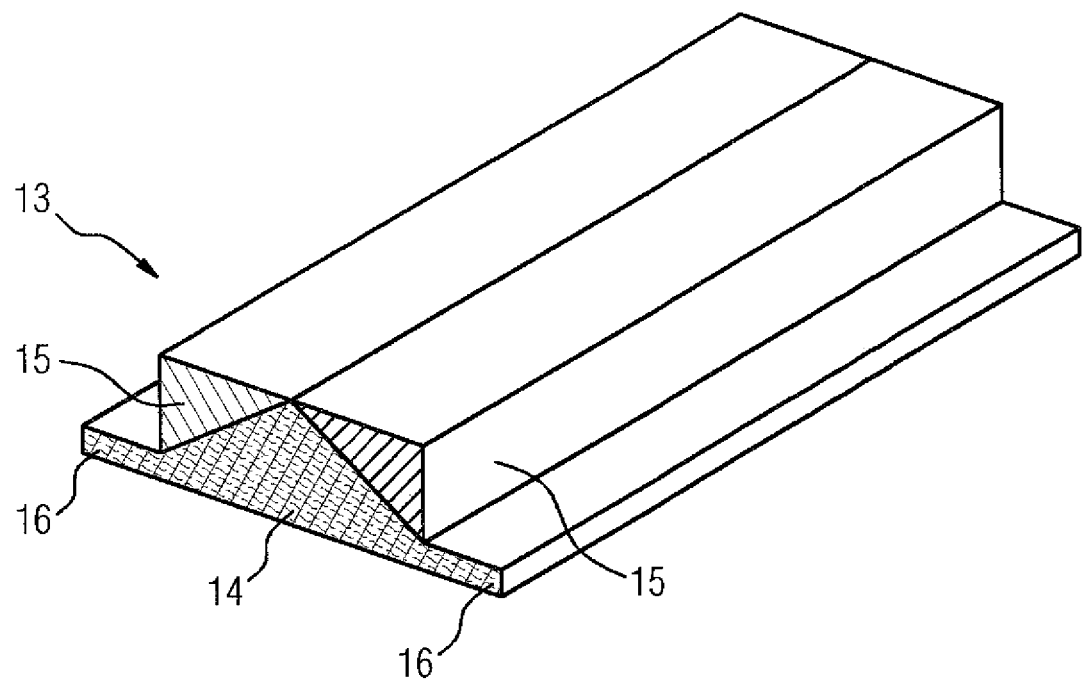
FIG. 5 shows a perspective view of a profile bar.

FIG. 5 shows an alternative exemplary embodiment of a profile bar 13, in which in each case the lateral bodies 15 have a triangular cross-section instead of a lozenge-shaped cross-section, so that the cross-section of the profile bar 13 is also T-shaped.

After the introduction of the conductor bundles 8 and profile bars 13 into the slots 106, the conductor ends 9 projecting out of the insulating hollow body stacks or insulating hollow body blocks 12 are connected in automated fashion at both axial laminate stack ends of the laminate stack 104 by means of a winding overhang 20 in each case to coils of the winding 102. The winding overhang 20 comprises bent connection conductors 21 which connect two conductor ends 9 of the conductor bundles 8 to one another in each case. In this situation, the conductor ends 9 of the conductor bundles 8 are soldered to the connection conductors 21.

Figure 6:
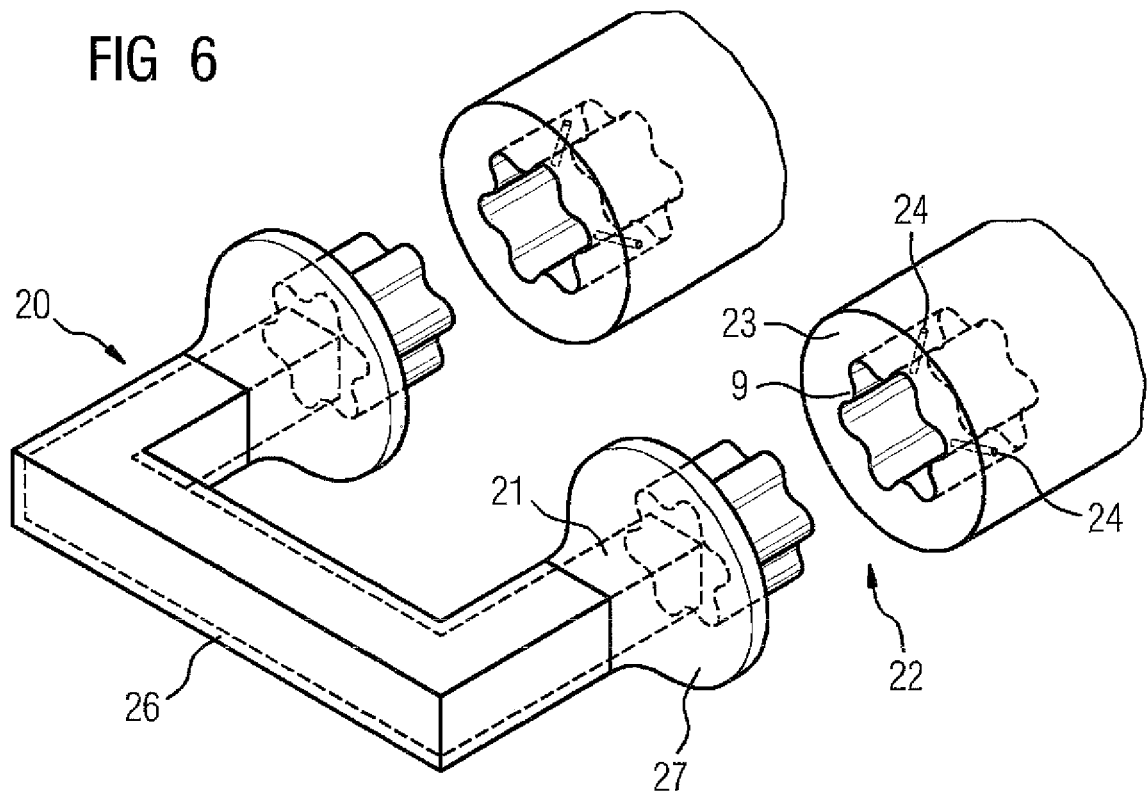
FIG. 6 shows a perspective view of a connection conductor of a winding overhang and of a conductor end.

FIG. 6 shows a perspective view of a connection conductor of a winding overhang which is connected by means of a plug-in connection 22 to a conductor end 9 of a conductor bundle 8. For this purpose, the connection conductor 21 and the conductor end 9 each have end regions corresponding to one another so that the connection conductor 21 can be plugged in to the conductor end 9. After the connection conductor 21 has been plugged in, the connection conductor 21 and the conductor end 9 are soldered to one another. For this purpose, forms of plug-in connectors 23 are used which have solder contact holes 24 for the insertion of soldering tips.

The winding overhang 20 is insulated by means of a winding overhang insulation 26 made from an electrically insulating material. For this purpose, after the connection of the connection conductor 21 to the conductor end 9, it is either insulated by means of a fully sealed molding or the connection conductors 21 are insulated beforehand, for example by using ceramic and support elements. Over an end region of the connection conductor 21 the winding overhang insulation 26 has for example a funnel-shaped connecting sleeve 27 in order to insulate the connection region of the connection conductor 21 and the conductor end 9.

FIGS. 7 to 21 show a second exemplary embodiment of a stator 100 of a rotating electric machine and a method for the automated production of a winding 102 of the stator 100. This exemplary embodiment differs from the first exemplary embodiment described with reference to FIGS. 1 to 6 principally in respect of the production of the conductor bundles 8 and the winding overhang 20.

Figure 7:
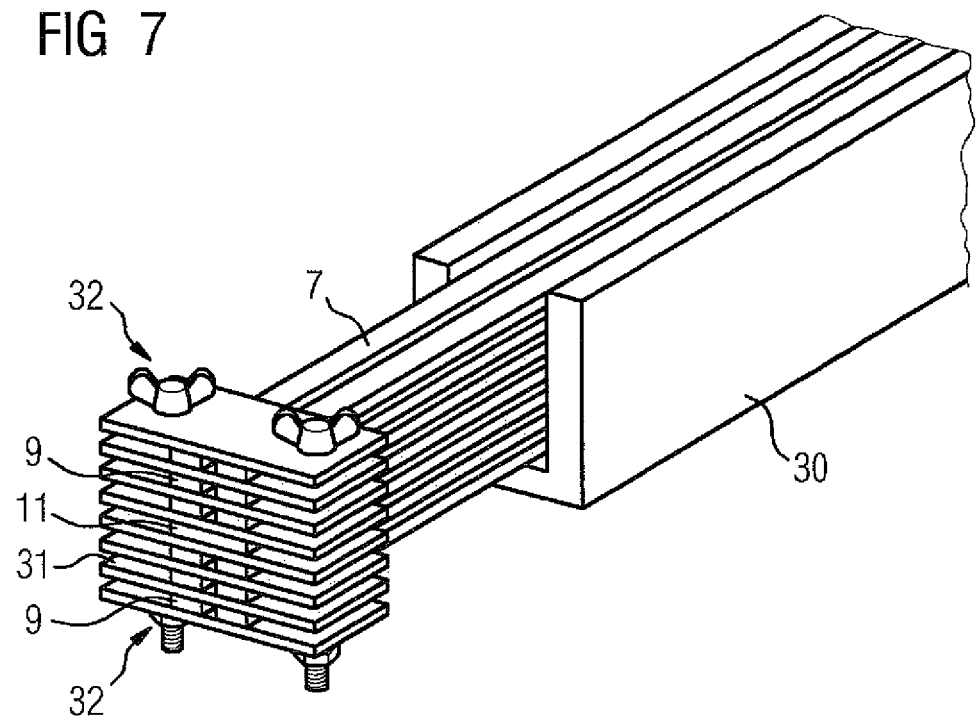
FIG. 7 shows a perspective view of conductor bars laid in a blank mold.
Figure 8:
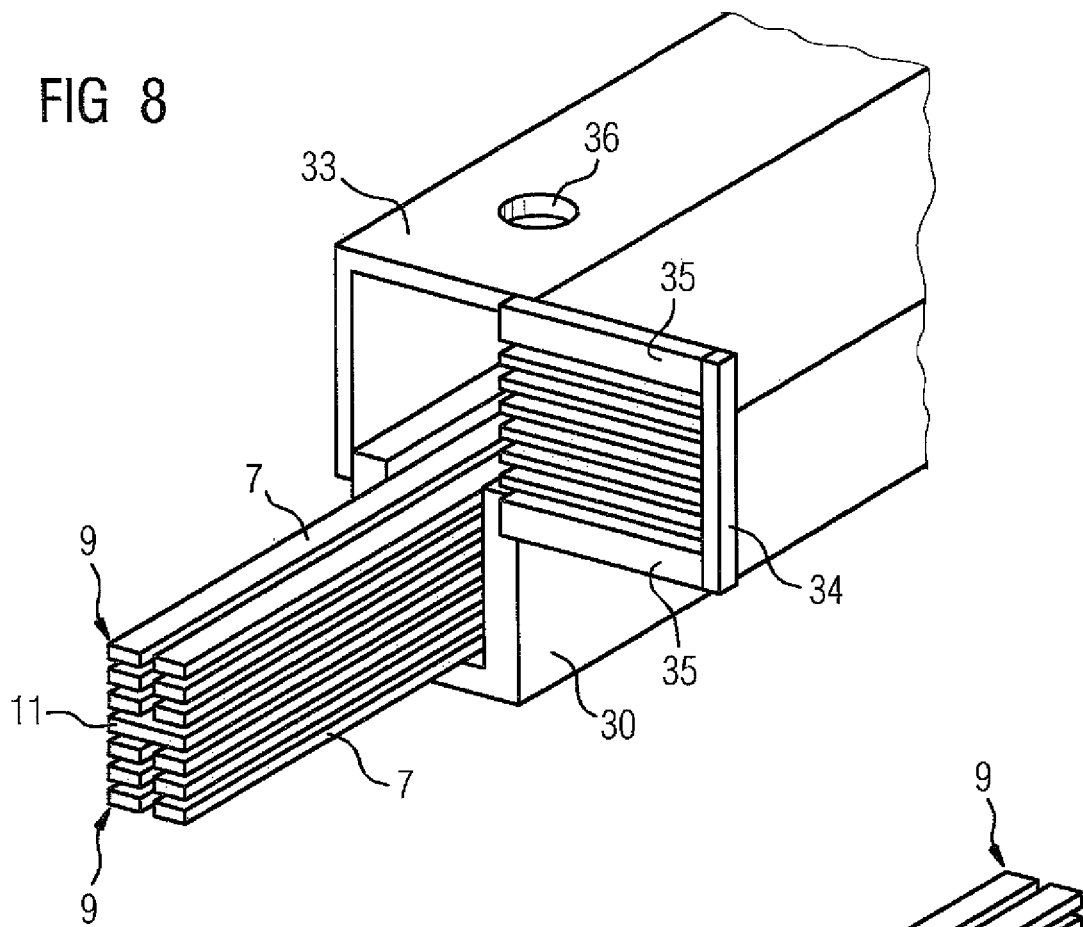
FIG. 8 shows a perspective view of conductor bars laid in a blank mold and shows a seal of the blank mold.

FIGS. 7 and 8 show the production of a conductor bundle 8. FIG. 9 shows a finished conductor bundle 8. In order to produce a conductor bundle 8 firstly the conductors 1 to 6, A to F are fabricated as straight conductor bars 7, for example made of aluminum or copper, which are longer than a slot 106. The conductor bars 7 are introduced into a blank mold 30 which has the same length as a slot 106, where the conductor ends 9 of the conductor bars 7 project out of the blank mold 30 on both sides and, as required together with a separating layer 11 and/or at least one cooling channel, are stacked in layered fashion between spacers 31 and are optionally tensioned by means of a tensioning device 32 (see FIG. 7). The blank mold 30 is sealed at the top by means of a blank mold cover 33 and at the ends by means of a sealing slider 34 which has sealing slats 35 in order to seal the interspaces between the layers of conductor bars 7, and is filled through a filling hole 36 in the blank mold cover 33 with electrically insulating insulation material, preferably with a ceramic material (see FIG. 8). After the insulation material has hardened and the blank mold cover 33, sealing slider 34, tensioning device 32, spacers 31 and blank mold 30 have been removed there remains a conductor bundle 8 with an insulating hollow body block 12, out of which the conductor ends 9 of the conductor bars 7 project on both sides (see FIG. 9).

As in the first exemplary embodiment, the conductor bundles 8 are introduced into the slots 106 of the laminate stack 104 and fixed there, in particular by means of profile bars 13, k, cf. FIGS. 2 to 5 and the descriptions thereof.

FIGS. 10 to 20 show a method and a device for the automated production of winding overhangs 20 by means of a robotic system. The production of winding overhangs 20 is described by way of example in the following, which connects conductor ends 9 of conductors A to F of a lower layer US of a first conductor bundle 8 and conductor ends 9 of conductors 1 to 6 of an upper layer OS of a second conductor bundle 8 to one another. In this situation, the conductor ends 9 are bent and soldered together in order to form the winding overhangs 20. It is a prerequisite for said production of winding overhangs 20 that the conductor bundles 8 are fabricated in such a manner that the conductor ends 9 project sufficiently far out of the insulating hollow body blocks 12 and thereby out of the slots 106 to allow them to be bent and soldered.

Figure 10:
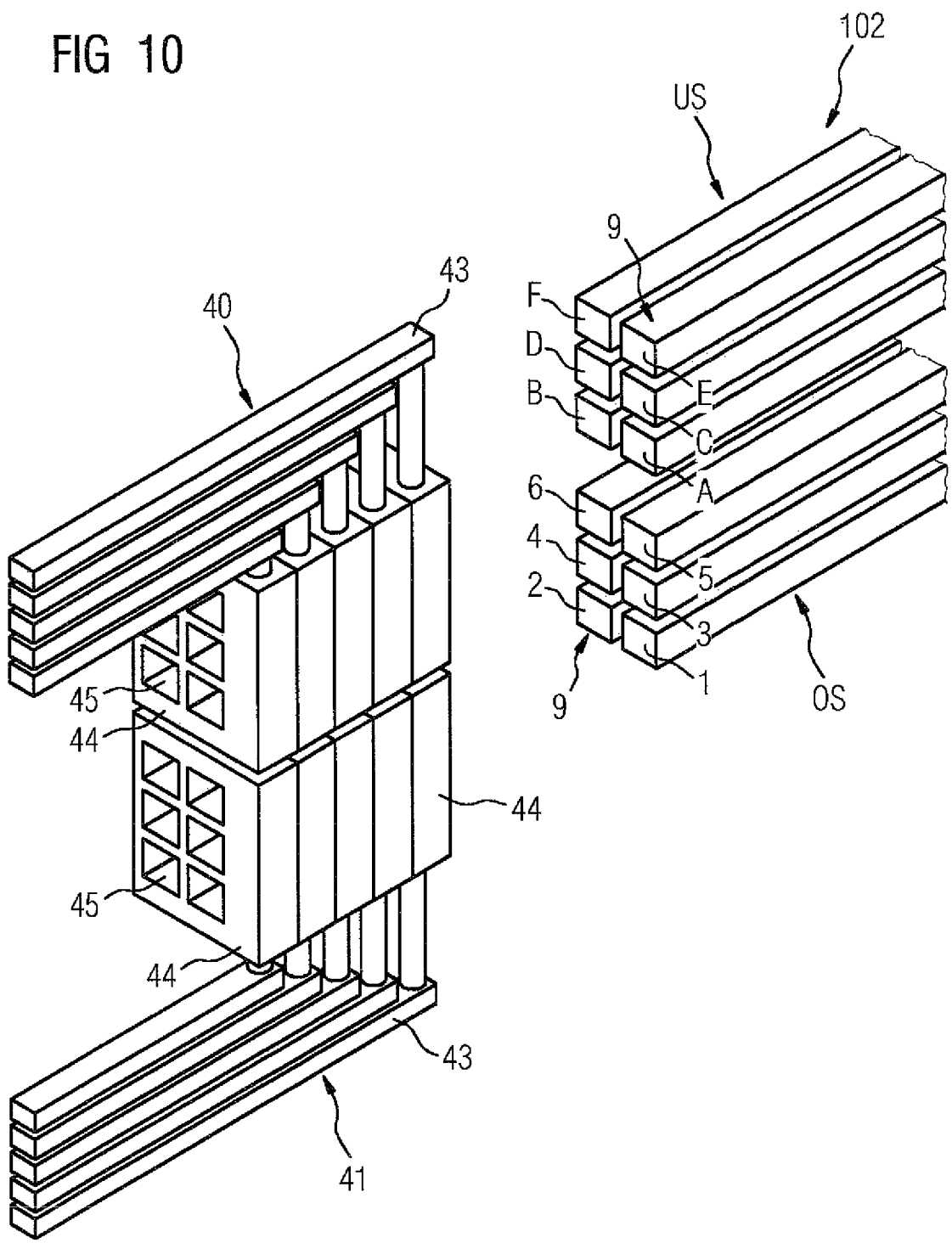
FIG. 10 shows a partial perspective view of a device for bending conductor ends.
Figure 11:
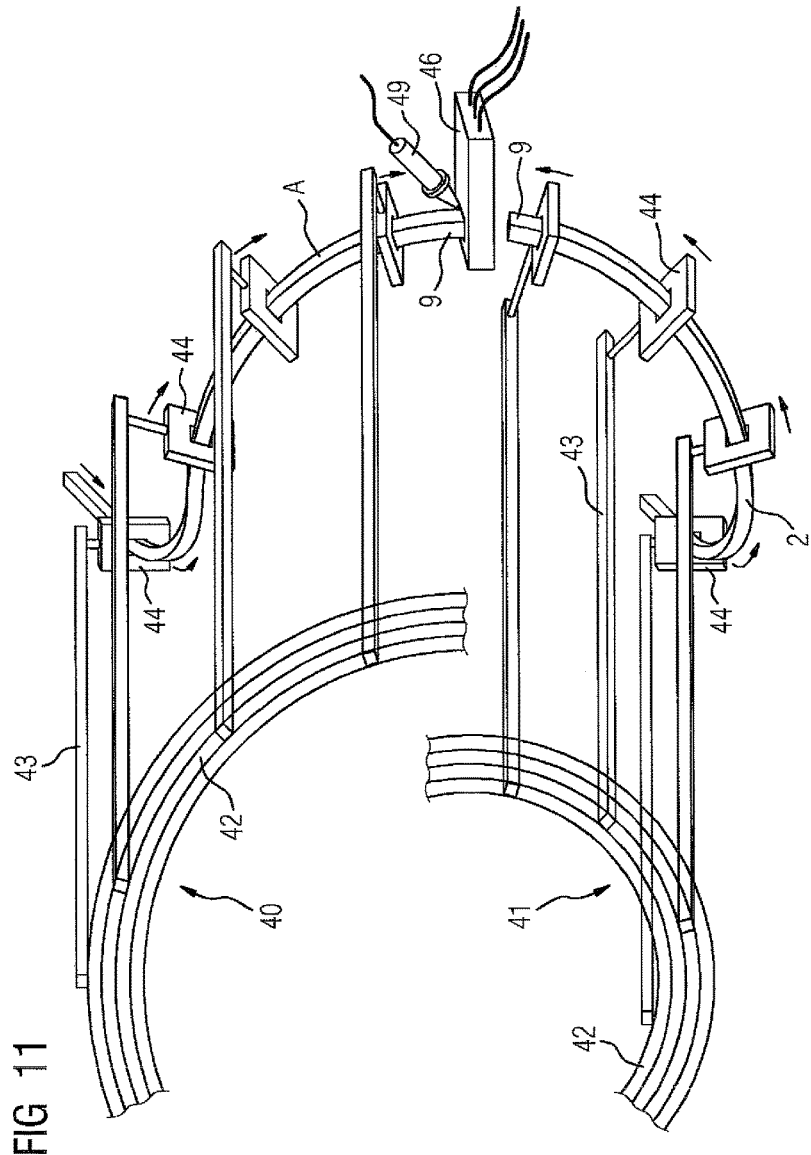
FIG. 11 shows a schematic view of a device for bending and soldering conductor ends.
Figure 12:
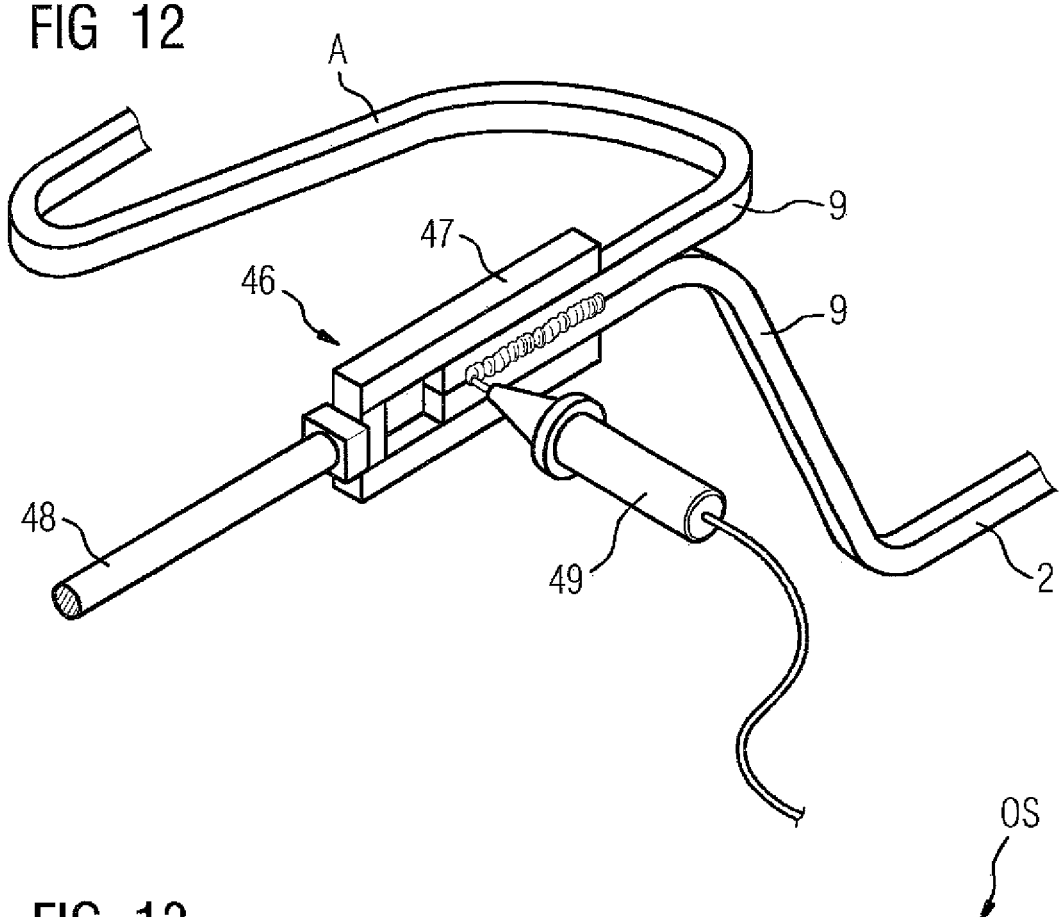
FIG. 12 shows a schematic view of a soldering unit.

FIGS. 10 to 12 show a device for bending and soldering the conductor ends 9. The device comprises two bending units 40, 41, each of which has a plurality of guide rails 42, guide arms 43 and bending heads 44, and also comprises a soldering unit 46.

Each bending head 44 in this situation is secured to a guide arm 43 which is guided in a curved guide rail 42 and has guide openings 45 through which conductors 1 to 6, A to F can be guided and which are set to the dimensions of the cross-sections of conductors 1 to 6, A to F, so that conductors 1 to 6, A to F guided through them are clamped in them. The guide rails 42 and guide arms 43 are designed such that conductors 1 to 6, A to F guided through the guide openings 45 of the bending heads 44 of a bending unit 40, 41 can be bent by moving the guide arms 43 of said bending unit 40, 41.

In order to produce a winding overhang 20, all the conductors A to F of a lower layer US of a first conductor bundle 8 are bent by means of a first bending unit 40 and at the same time all the conductors 1 to 6 of an upper layer OS of a second conductor bundle 8 are bent by means of the second bending unit 41 such that the conductor ends 9 of all said conductors 1 to 6, A to F meet at the soldering unit 46.

Each pair of conductor ends 9 to be connected is then soldered by means of the soldering unit 46.

This is illustrated in FIG. 11 by way of example and schematically for a conductor A of a lower layer US of a first conductor bundle 8 and a conductor 2 of an upper layer OS of a second conductor bundle 8.

FIG. 12 shows a schematic illustration of the soldering unit 46. The soldering unit 46 comprises at least one gripper device 47 arranged on a gripper device arm 48, and at least one soldering robot arm 49. Each pair of conductor ends 9 to be connected is held together on two longitudinal sides by means of the at least one gripper device 47 and soldered to one another by means of the soldering robot arm 49. This is illustrated FIG. 12 again by way of example and schematically for a conductor A of an upper layer OS of a lower layer US of a first conductor bundle 8 and a conductor 2 of an upper layer OS of a second conductor bundle 8.

Figure 13:
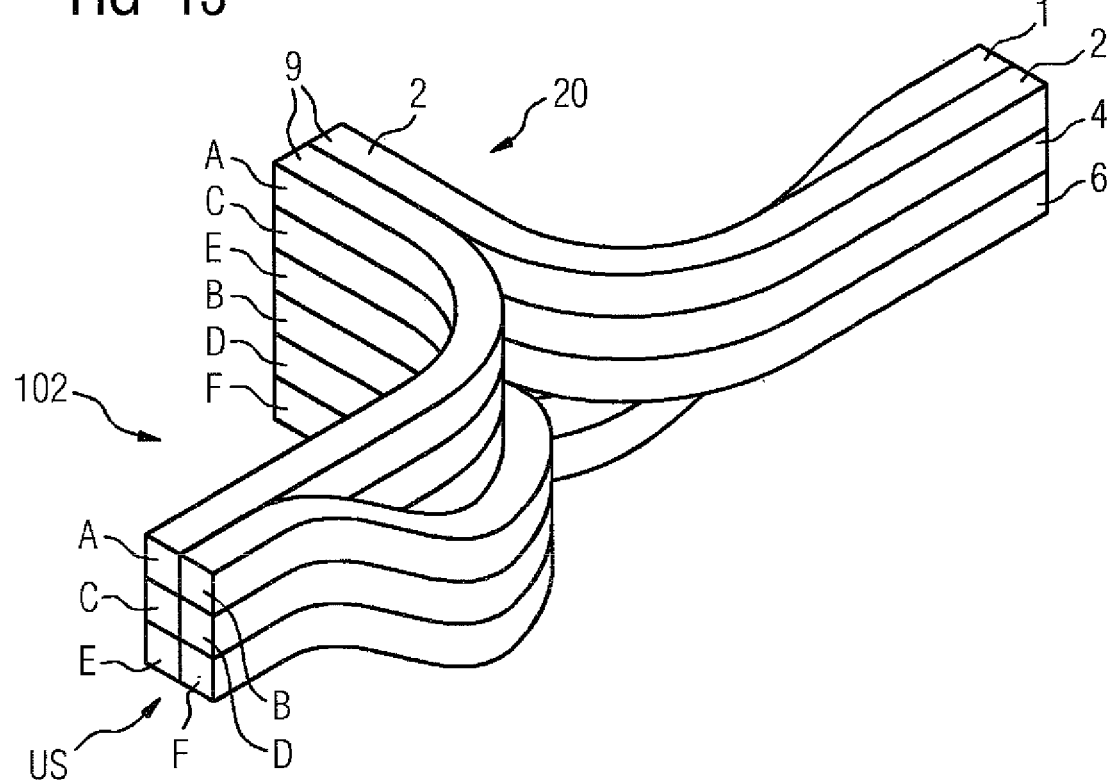
FIG. 13 shows a perspective view of a winding in the region of a first winding overhang on a non-switching surface of the winding.

FIG. 13 shows the winding 102 in the region of a first winding overhang 20 on a "non-switching surface" of the winding 102. Conductor ends 9 arranged next to one another of a conductor 1 to 6 of an upper layer OS and of a conductor A to F of a lower layer US are in each case soldered to one another. For this purpose, conductor ends 9 of conductors 1 to 6, A to F delivered to the soldering unit 46 are firstly twisted and bent together such that conductor ends 9 to be connected to one another are arranged next to one another, see also FIGS. 14 to 18.

FIGS. 14 to 19 illustrate the production of the winding 102 in the region of the second winding overhang 20 on a "switching surface" of the winding 102. In this situation also, conductor ends 9 of conductors 1 to 6, A to F are firstly twisted and bent such that conductor ends 9 to be connected to one another are arranged next to one another.

Figure 14:
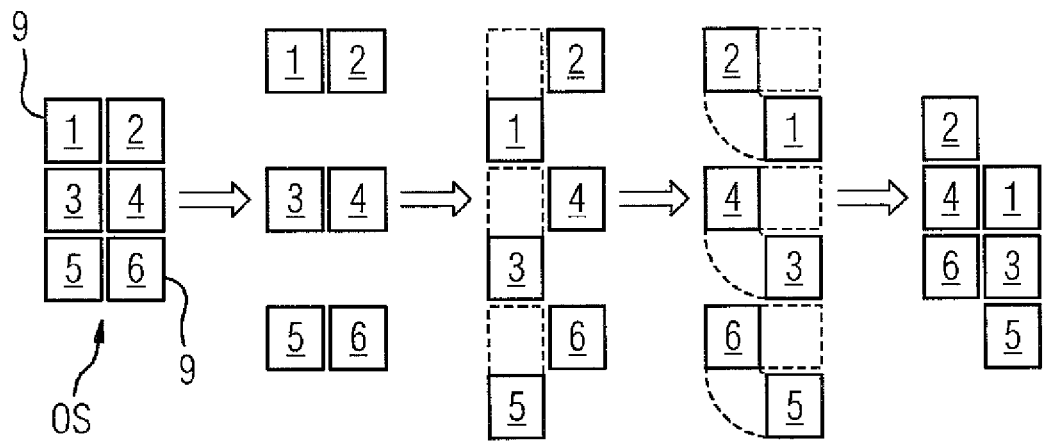
FIG. 14 shows a twisting schema for an upper layer of conductors.

FIG. 14 shows by way of example the twisting of the conductor ends 9 of conductors 1 to 6 of an upper layer OS. In this case, layers of conductor ends 9 lying next to one another are firstly fanned out such that the distance between the layers is increased. Conductor ends 9 of the individual layers are then twisted together in pairs by firstly bending a first conductor end 9 of a pair of adjacent conductor ends 9 in a first direction and subsequently bending the first conductor end 9 of the pair in a second direction orthogonal to the first direction and the second conductor end 9 of the pair in the opposite direction such that the second conductor end 9 assumes the position of the first conductor end 9 prior to the twisting. Finally the conductor ends 9 are pushed together such that the conductor ends 9 of the original layers are offset relative to one another.

Figure 15:
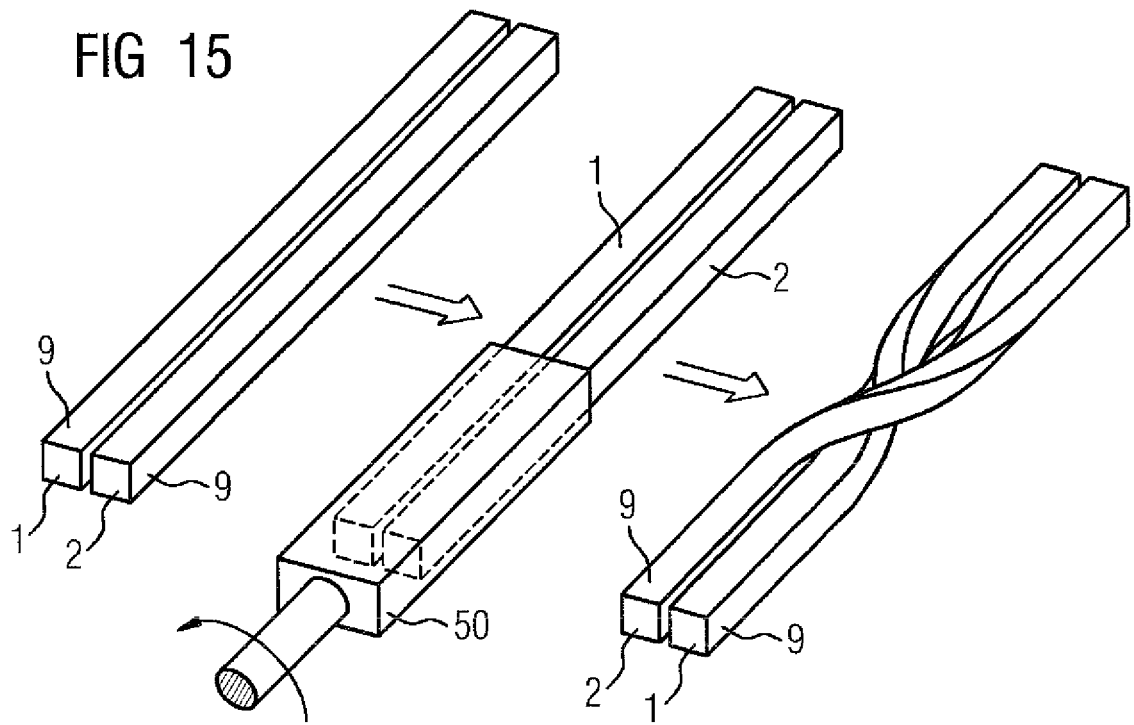
FIG. 15 shows a schematic view of a twisting of two conductor ends.

FIG. 15 shows a schematic illustration of a twisting unit 50 for twisting two conductor ends 9. The twisting unit receives the two conductor ends 9, rotates about an axis of rotation parallel to the longitudinal axes of the conductor ends 9 and subsequently releases the conductor ends 9 again.

Figure 16:
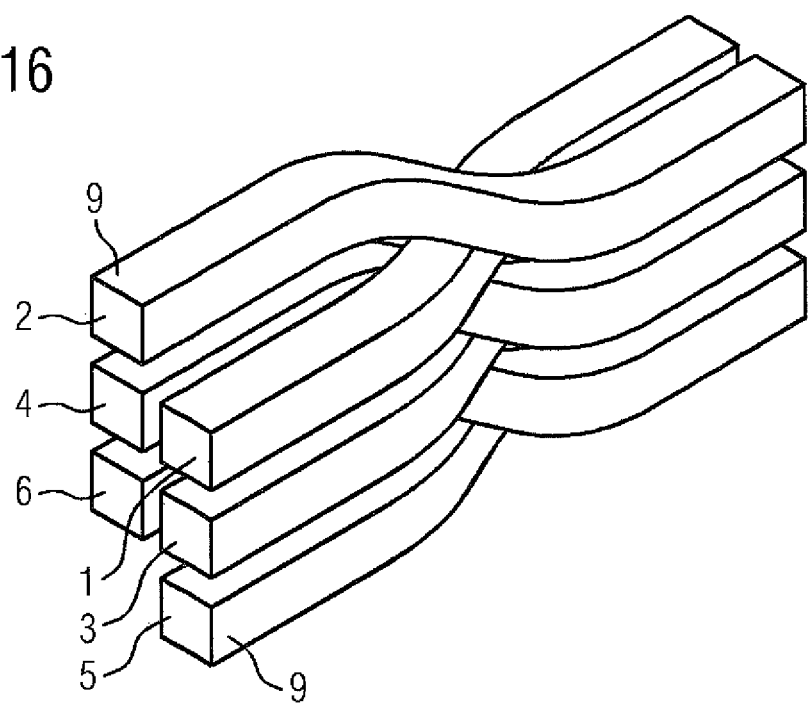
FIG. 16 shows a perspective view of twisted conductor ends of an upper layer of conductors.
Figure 17:
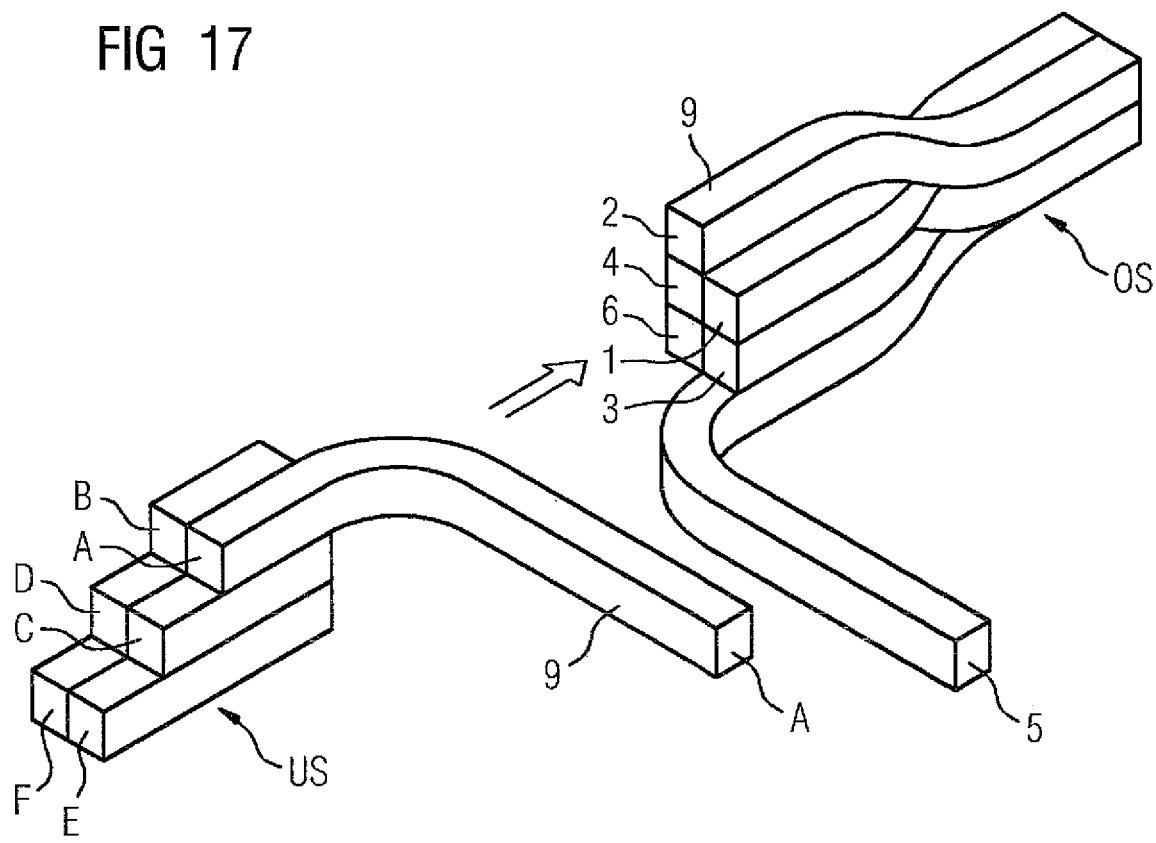
FIG. 17 shows a perspective view of twisted conductor ends of an upper layer and shows a lower layer of conductors.

FIGS. 16 and 17 show the result of the twisting of the conductor ends 9 of the upper layer OS described with reference to FIGS. 14 and 15 on the switching surface of the winding 102.

After the twisting the conductor ends 9 are bent such that conductor ends 9 to be connected to one another are arranged next to one another. Conductor ends 9 arranged next to one another of each of a conductor 1 to 6 of an upper layer OS and of a conductor A to F of a lower layer US are soldered to one another. One conductor end 9 of the upper layer OS and one conductor end 9 of the lower layer US on the switching surface of the winding 102 is used in each case as the electrical supply to the coil formed from conductors 1 to 6 of the upper layer OS and conductors A to F of the lower layer US and is therefore not connected to any other conductor end 9.

Figure 18:
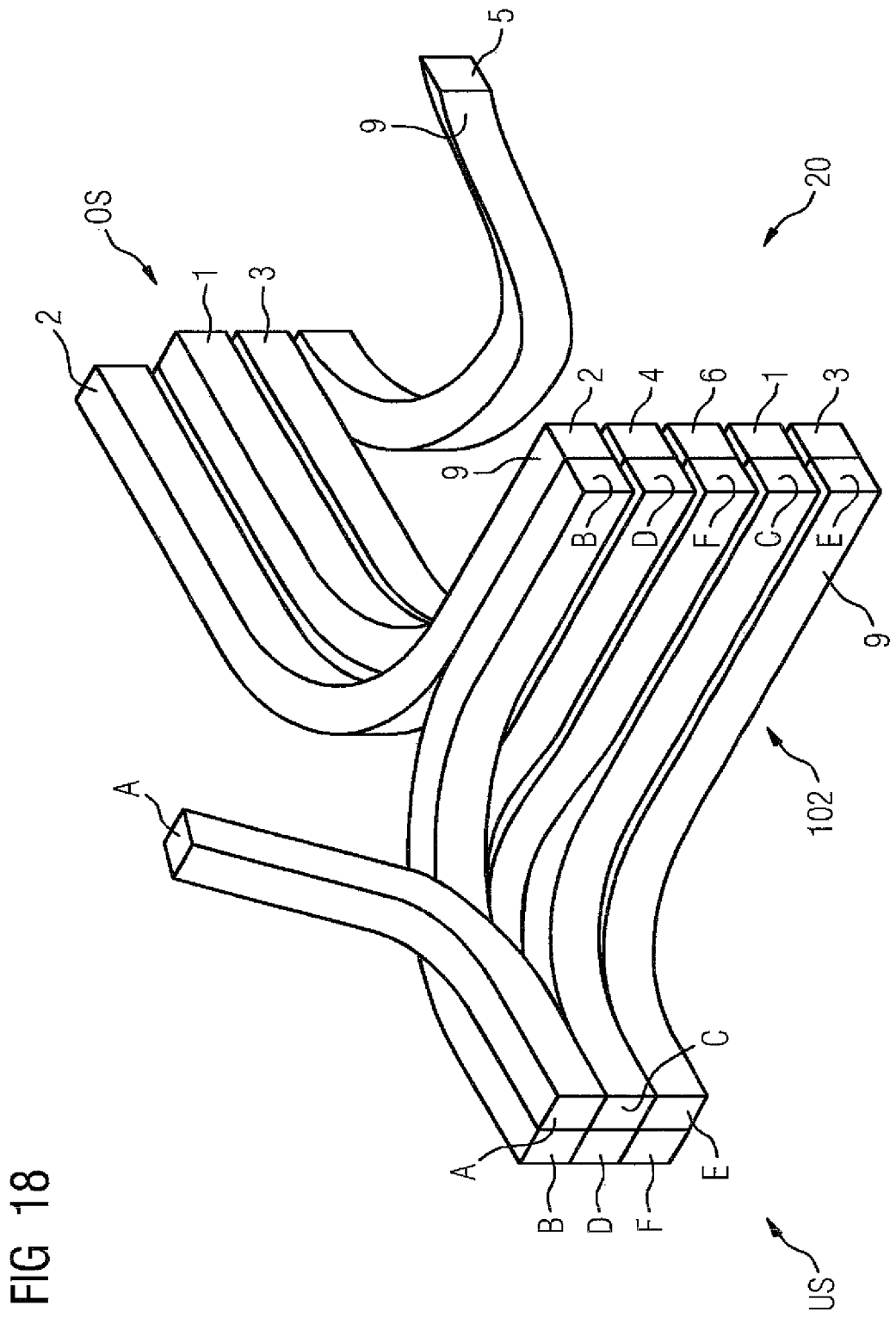
FIG. 18 shows a perspective view of a winding in the region of a first winding overhang on a switching surface of the winding.

FIG. 18 shows the winding 102 in the region of the winding overhang 20 on the switching surface of the winding 102.

Figure 19:
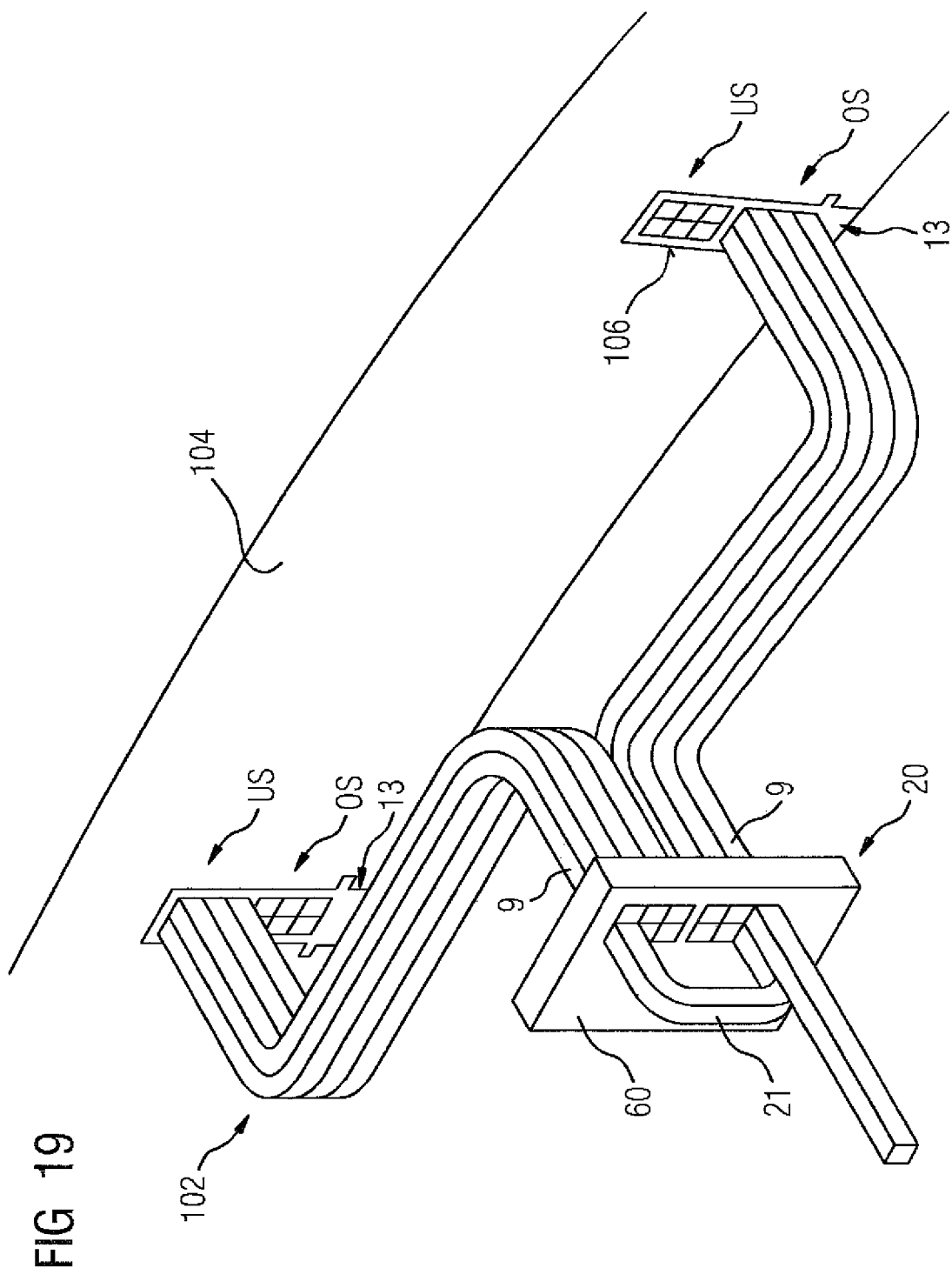
FIG. 19 shows a schematic view of a connection of conductor ends to winding overhangs.

FIG. 19 shows an alternative to the method described with reference to FIGS. 12 to 18 for the connection of the conductor ends 9 to winding overhangs 20. With this alternative method, the conductor ends 9 are not soldered to one another but are bent towards a connection unit 60 where they are connected electrically to one another in pairs by means of connection conductors 21.

An alternative to the methods described with reference to FIGS. 10 to 19 for the automated connection of conductors 1 to 6, A to F of the conductor bundles 8 by means of winding overhangs 20 provides for winding overhang ends being produced separately and in each case being connected to conductor ends 9. With this alternative, the conductor ends 9 project less far out of the insulating hollow body blocks 12 and slots 106 than in the case of the methods described with reference to FIGS. 10 to 19 because they are not bent together to form winding overhangs 20. Instead, the alternative method provides for cutting, bundling, appropriately bending and forming the conductor ends 9, and using a device in each case to push the prefabricated winding overhang ends over the conductor ends 9 of the conductor bundles 8 at each axial end of the laminate stack 104 in automated fashion and connect them to the conductor ends 9, for example by means of cold pressing or wave soldering.

Figure 20:
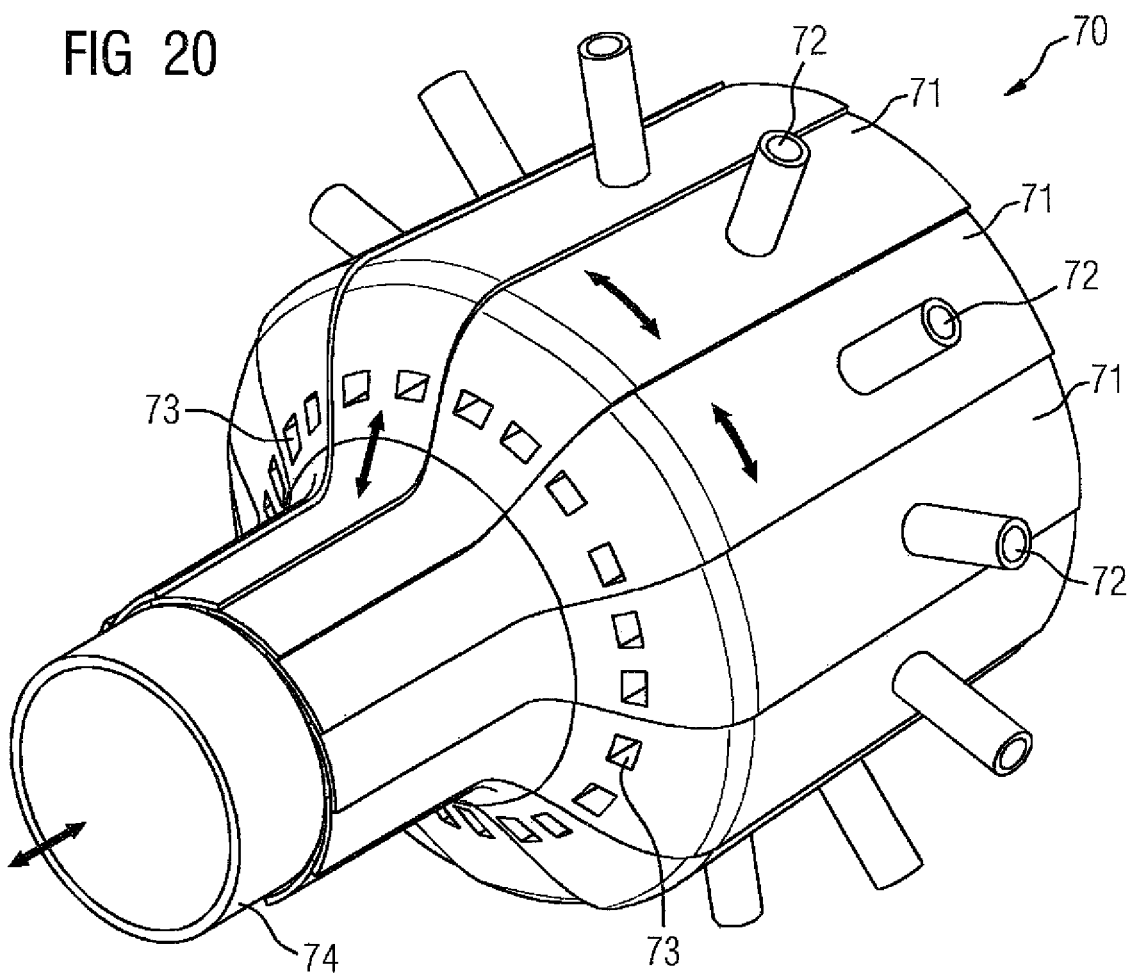
FIG. 20 shows a perspective view of a casting unit for the automated insulation of a winding overhang.

FIG. 20 shows a casting unit 70 for the automated insulation of a winding overhang 20 after fabrication of the winding 102. The casting unit 70 has the form of a funnel for receiving a winding overhang 20. The funnel has a plurality of funnel segments 71 running axially which can be relocated over one another by means of mutual rotation about a longitudinal axis of the casting unit 70, so that the diameter of the funnel can be adjusted to the diameter of the winding overhang 20. The funnel segments 71 each have a casting feed line 72 through which the funnel can be filled with an insulation material in order to insulate the winding overhang 20. Furthermore, the funnel segments 71 have funnel segment openings 73 for cooling channels and/or for guidance of the funnel. At one axial end the casting unit 70 has an end seal 74 which can be moved in the axial direction such that the position thereof can be adjusted to the axial extent of the winding overhang 20.

Figure 21:
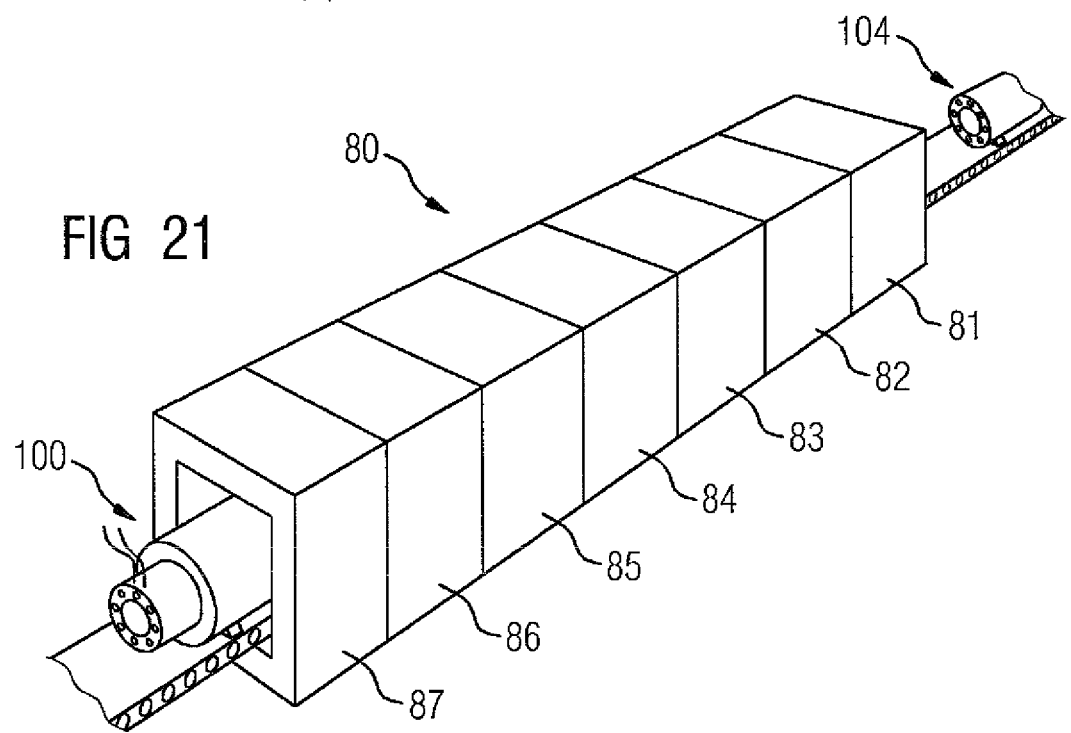
FIG. 21 shows a perspective view of a production line for the completely automated production of a winding of a stator.

FIG. 21 shows a production line 80 for the completely automated production of a winding 102 of a stator 100. Laminate stacks 104 are delivered to the production line 80. In the production line 80 the laminate stacks 104 are provided in each case with a winding 102. Stators 100 are output at the end of the production line 80.

The production line 80 has a plurality of production line sections 81 to 87, in each of which one of the work processes described with reference to FIGS. 7 to 20 is carried out. In a first production line section 81, conductor bars 7 are cut to size. In a second production line section 82, the conductor bars 7 are stacked and inserted into blank molds 30 as described with reference to FIG. 7. In a third production line section 83, the blank molds 30 are filled with insulation material as described with reference to FIG. 8, thereby producing conductor bundles 8 with insulating hollow body blocks 12. In a fourth production line section 84, the conductor bundles 8 are in each case introduced into a slot 106 of the laminate stack 104 and fixed there as described with reference to FIGS. 2 to 4. In a fifth production line section 85, the windings 102 in the region of the winding overhangs 20 are formed by bending the conductor ends 9 projecting out of the slots 106 as described with reference to FIGS. 10 and 11. In a sixth production line section 86, conductor ends 9 are connected electrically to winding overhangs 20 as described with reference to FIGS. 12 to 18 or alternatively to FIG. 19. In a seventh production line section 87, the winding overhangs 20 are electrically insulated as described with reference to FIG. 20.

Although the invention has been illustrated and described in detail by means of preferred exemplary embodiments, the invention is not restricted by the disclosed examples and other variations can be derived therefrom by the person skilled in the art without departing from the scope of protection of the invention.

The invention claimed is:

1. A method for automated production of a winding of a stator for a rotating electric machine, said method comprising:
    producing a conductor bundle from straight conductors which are placed in parallel relationship and electrically insulated from one another and which are each sized at length that is longer than a length of a slot in a laminate stack of the stator;
    introducing the conductor bundle into the slot of the stator so that opposite conductor ends of each conductor project out of the slot;
    electrically connecting each of the conductor ends of the conductors at both axial ends of the laminate stack via a winding overhang to form coils of the winding; and
    closing the slot with a profile bar on a side of an air gap between the stator and a rotor of the electric machine, with the profile bar including a base body which has a shape of a prism with a triangular base area and two edges extending orthogonal to the base area, with flanges protruding from the edges respectively, thereby providing the base body with a T-shaped cross-section with arms formed by the flanges, and a triangular foot.

2. The method of claim 1, and further comprising applying an overlay of a magnetically conductive and electrically insulating material on the base body, wherein the overlay has a form of two lateral bodies, each said lateral body having a lozenge-shaped cross-section and resting on a flange surface of a corresponding one of the flanges and an adjoining corresponding lateral surface of the base body.

3. The method of claim 1, further comprising electrically insulating the conductors of the conductor bundle from each other and from the laminate stack by introducing a ceramic material throughout the slot.

4. The method of claim 1, wherein the conductor bundle is produced by producing each conductor from an insulating hollow body and casting the insulating hollow body homogeneously and without air bubbles using an electrically conductive material.

5. The method of claim 1, wherein the conductor bundle is produced by producing each conductor from an insulating hollow body block with through-holes for the conductors and casting the insulating hollow body block homogeneously and without air bubbles using an electrically conductive material.

6. The method of claim 1, wherein the conductor bundle is produced by placing conductor bars of a length which is longer than the length of the slot in spaced-apart relationship into a blank mold of same length as the length of the slot, so that conductor ends of the conductor bars project out of the blank mold on both sides, filling the blank mold with an electrically insulating insulation material for electrical insulation of the conductor bars, and removing the blank mold after the insulation material has hardened.

7. The method of claim 1, further comprising soldering adjacent two adjacent conductor ends to a connection conductor to thereby produce the winding overhang.

8. The method of claim 7, further comprising connecting the connection conductor with the two connector ends via a plug-in connection prior to soldering.

9. The method of claim 7 further comprising bending adjacent two conductor ends projecting out of different slots towards each other to produce the winding overhang, and electrically connecting the conductor ends to each other.

10. The method of claim 1, further comprising casting the winding using an insulation material in a region of the winding overhang.

11. The method of claim 1, wherein the base body is made of fiber glass.

12. The method of claim 11, wherein the overlay is made of a soft magnetic composite.

13. A stator for a rotating electric machine, comprising:
    a laminate stack having a plurality of slots open towards an air gap between the stator and a rotor of the electric machine;
    a winding including coils, said coils having turns which pass through the slots of the laminate stack;
    a ceramic material to electrically insulate the turns of the coils within the slots from each other and from the laminate stack; and
    a plurality of profile bars, each of the profile bars being adapted to close a corresponding one of the slots in one-to-one correspondence at a side of the air gap, said profile bar including a base body having a shape of a prism with a triangular base area and two edges extending orthogonal to the base area, with flanges protruding from the edges respectively, thereby providing the base body with a T-shaped cross-section with arms formed by the flanges, and a triangular foot,
    wherein the winding is made by a method as set forth in claim 1.

14. The stator of claim 13, and further comprising an overlay of a magnetically conductive and electrically insulating material on the base body, wherein the overlay has a form of two lateral bodies, each said lateral body having a lozenge-shaped cross-section and resting on a flange surface of a corresponding one of the flanges and an adjoining corresponding lateral surface of the base body.

* * * * *